(No Model.) 10 Sheets—Sheet 1.

F. LEMAN.
MACHINE FOR THE MANUFACTURE OF PILLARS FOR WATCH PLATES.

No. 380,497. Patented Apr. 3, 1888.

(No Model.) 10 Sheets—Sheet 2.

F. LEMAN.
MACHINE FOR THE MANUFACTURE OF PILLARS FOR WATCH PLATES.

No. 380,497. Patented Apr. 3, 1888.

(No Model.) 10 Sheets—Sheet 4.

F. LEMAN.
MACHINE FOR THE MANUFACTURE OF PILLARS FOR WATCH PLATES.

No. 380,497. Patented Apr. 3, 1888.

(No Model.) 10 Sheets—Sheet 5.

F. LEMAN.
MACHINE FOR THE MANUFACTURE OF PILLARS FOR WATCH PLATES.

No. 380,497. Patented Apr. 3, 1888.

(No Model.) 10 Sheets—Sheet 6.
F. LEMAN.
MACHINE FOR THE MANUFACTURE OF PILLARS FOR WATCH PLATES.

No. 380,497. Patented Apr. 3, 1888.

(No Model.) 10 Sheets—Sheet 8.

F. LEMAN.

MACHINE FOR THE MANUFACTURE OF PILLARS FOR WATCH PLATES.

No. 380,497. Patented Apr. 3, 1888.

Fig. 8.

(No Model.) 10 Sheets—Sheet 9.

F. LEMAN.
MACHINE FOR THE MANUFACTURE OF PILLARS FOR WATCH PLATES.

No. 380,497. Patented Apr. 3, 1888.

Fig. 9.

Witnesses
Chas. J. Williamson
Henry C. Hazard

Inventor:
Frank Leman, by
Prindle and Russell, his Attys (No Model.)  10 Sheets—Sheet 10.

F. LEMAN.
MACHINE FOR THE MANUFACTURE OF PILLARS FOR WATCH PLATES.

No. 380,497.  Patented Apr. 3, 1888.

Witnesses:
Chas. J. Williamson
Henry C. Hazard

Inventor:
Frank Leman, by
Prindle and Russell, his Attys

UNITED STATES PATENT OFFICE.

FRANK LEMAN, OF ELGIN, ILLINOIS.

MACHINE FOR THE MANUFACTURE OF PILLARS FOR WATCH-PLATES.

SPECIFICATION forming part of Letters Patent No. 380,497, dated April 3, 1888.

Application filed August 5, 1886. Serial No. 210,098. (No model.)

*To all whom it may concern:*

Be it known that I, FRANK LEMAN, of Elgin, in the county of Kane, and in the State of Illinois, have invented certain new and useful Improvements in Mechanism for Manufacturing Pillars for Watch-Plates; and I do hereby declare that the following is a full, clear, and exact description thereof, reference being had to the accompanying drawings, in which—

Letters of like name and kind refer to like parts in each of the figures.

The design of my invention is to enable pillars for watch-plates to be produced by automatic mechanism; and to this end said invention consists in a mechanism in which the various operations between the roughing out and completion of a pillar are automatically performed, substantially as and for the purpose hereinafter specified.

Figure 1:
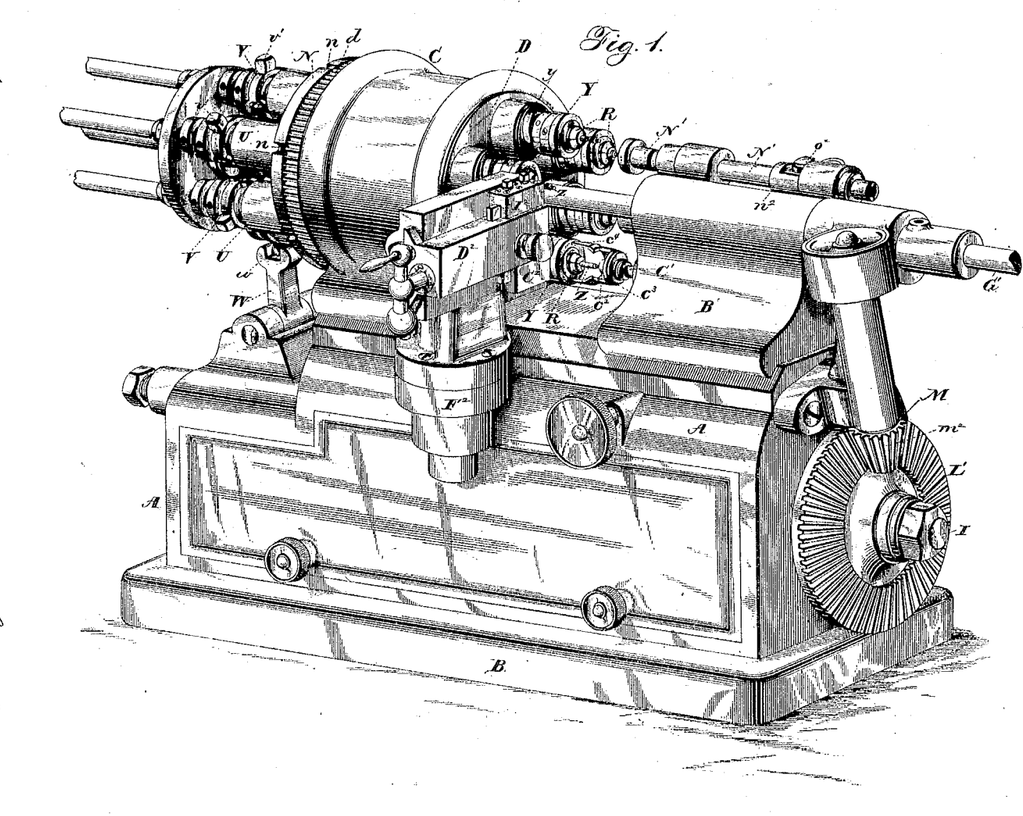
Figure 1 is a perspective view of my machine as arranged for use.
Figure 2:
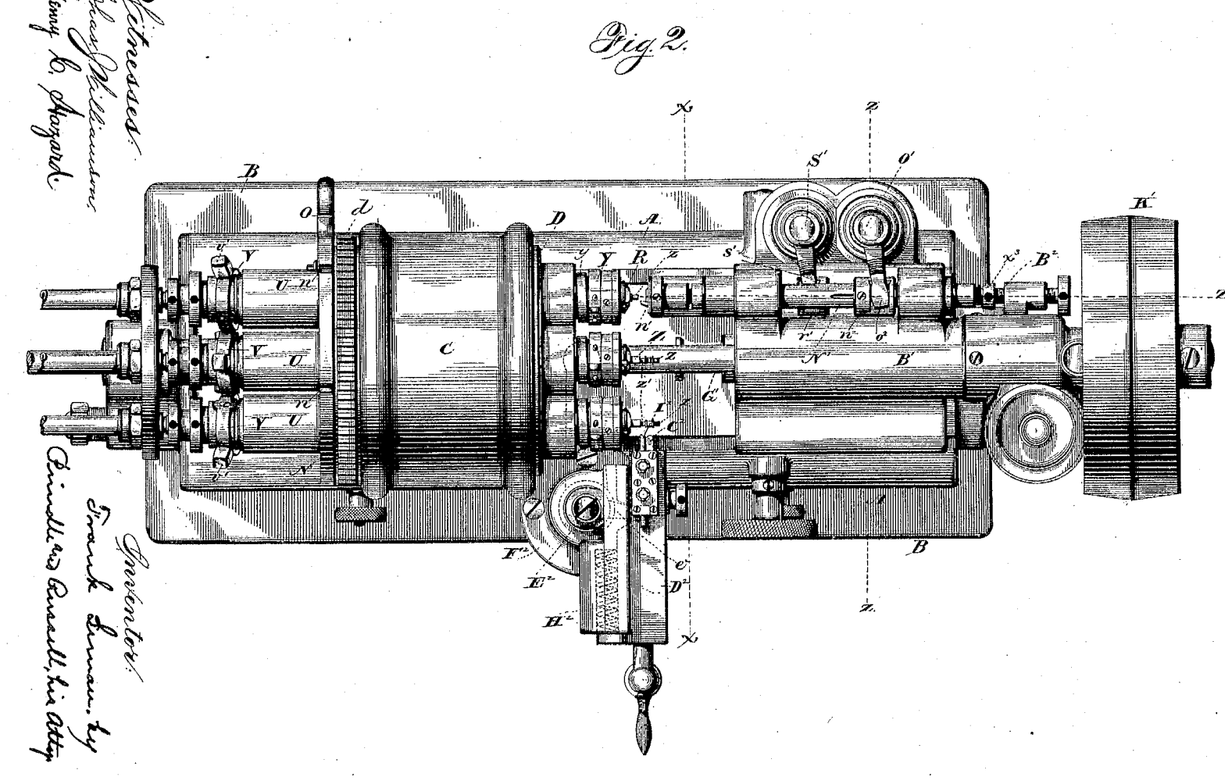
Fig. 2 is a plan view of the same from the upper side.
Figure 3:
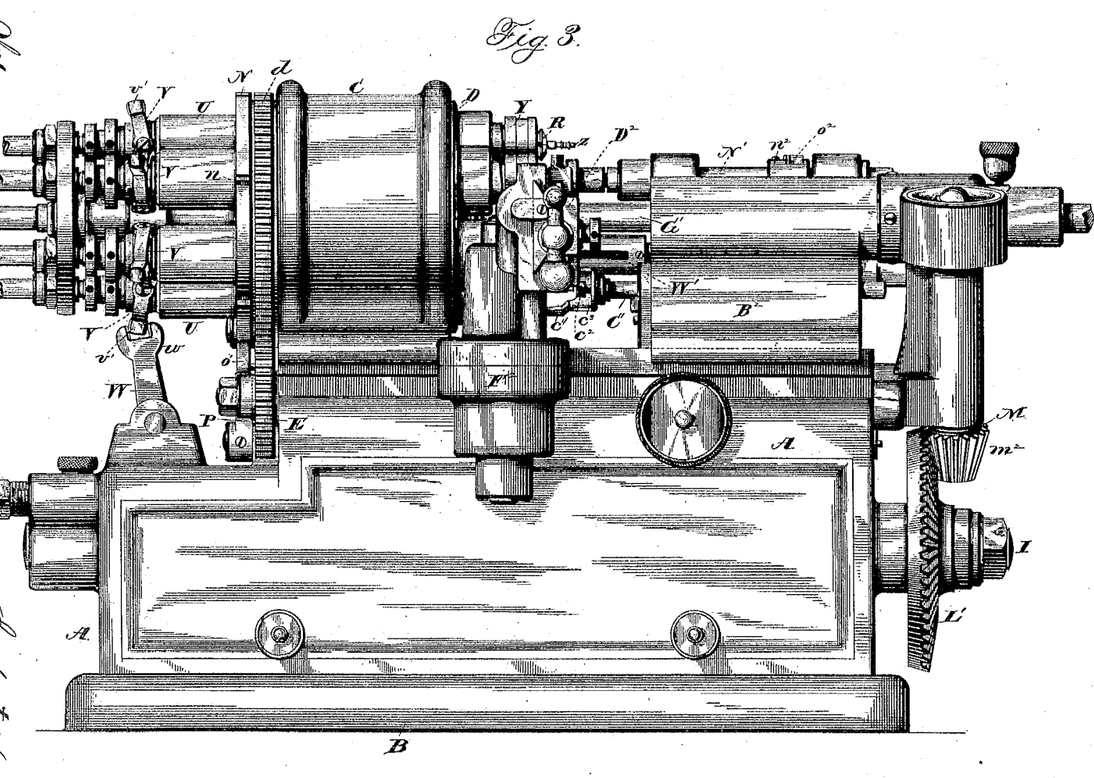
Fig. 3 is an elevation of said machine from the front.
Figure 4:
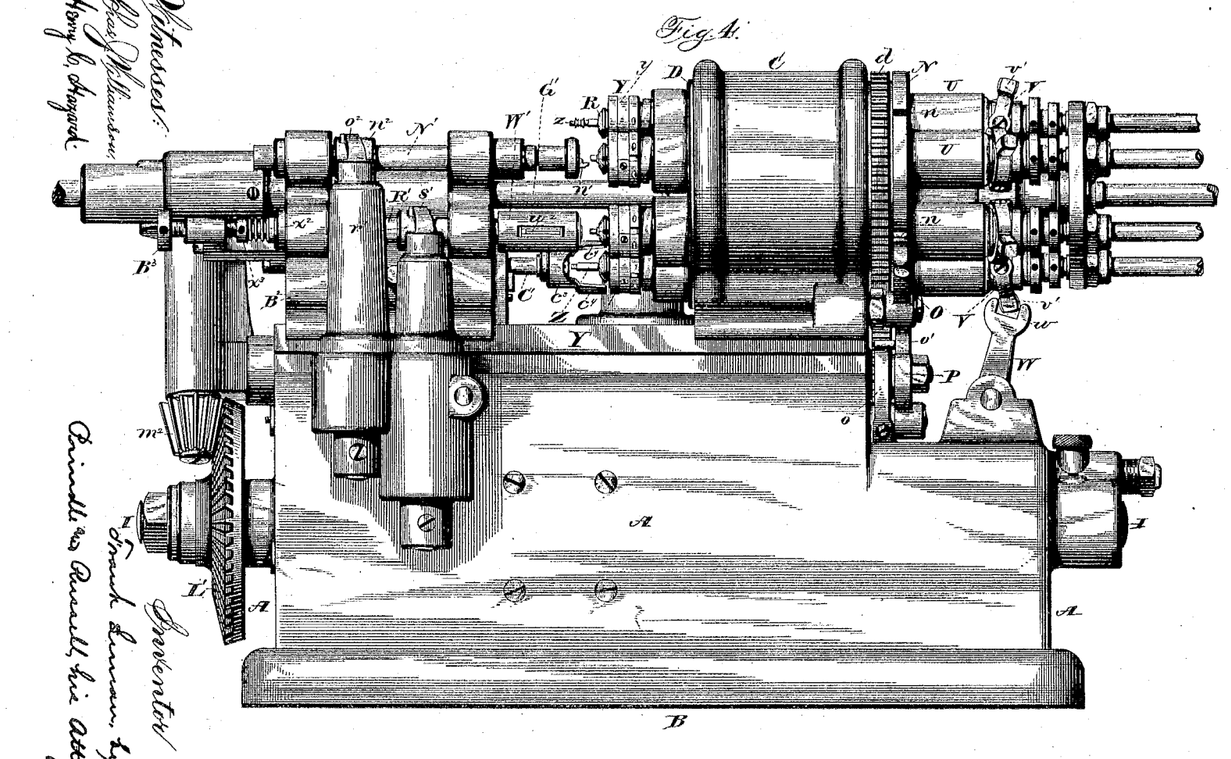
Fig. 4 is a like view of the same from the rear.
Figure 5:
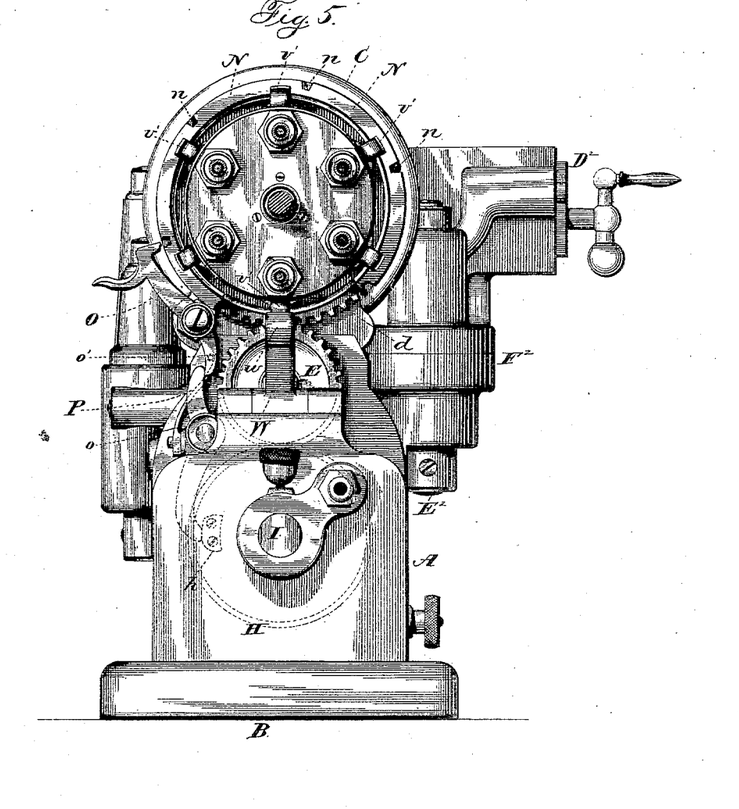
Fig. 5 is an elevation of the front end of said machine.
Figure 6:
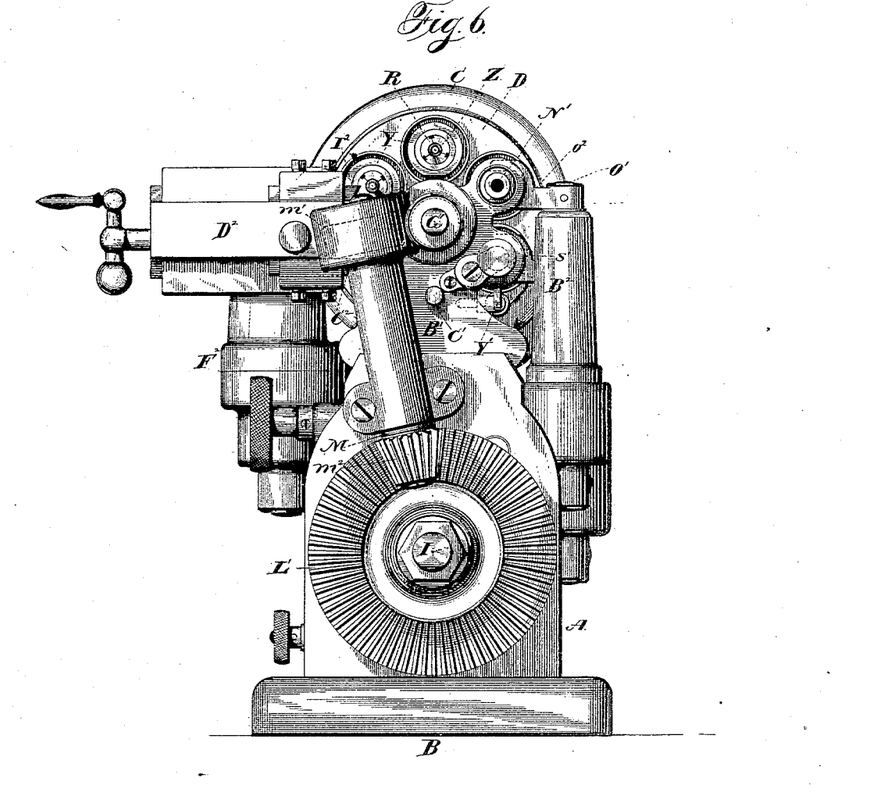
Fig. 6 is an elevation of the rear end of the same.
Figure 7:
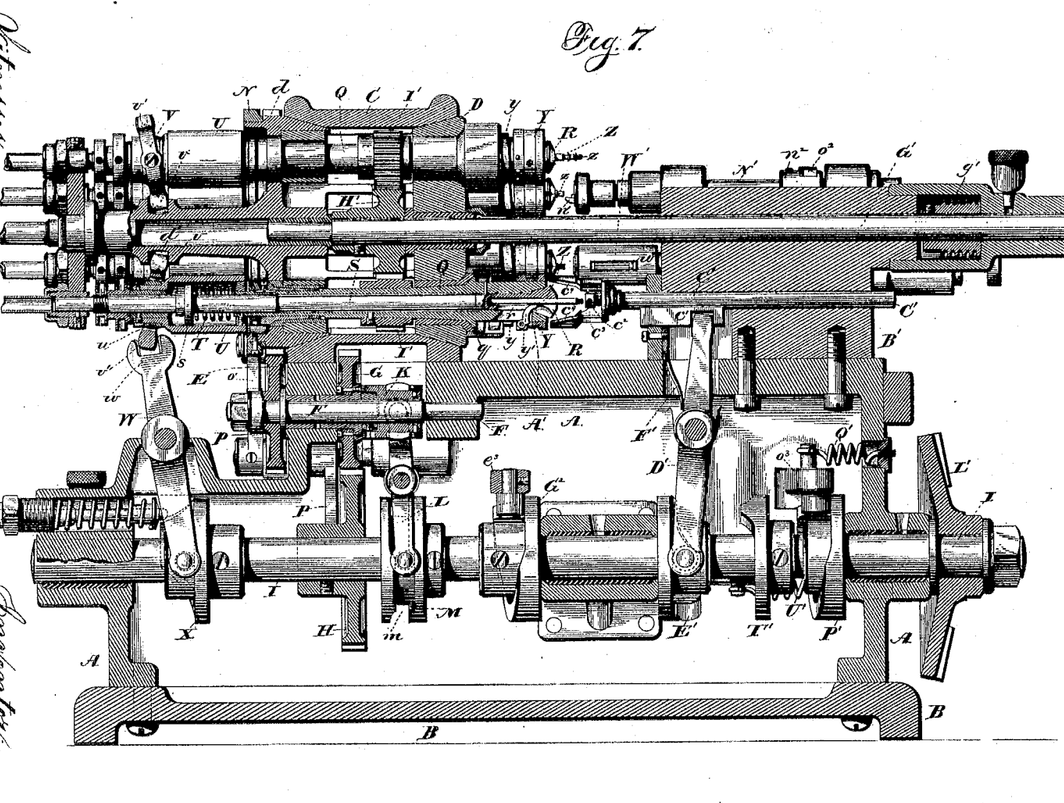
Fig. 7 is a vertical central section of said machine upon its longitudinal axis.
Figure 8:
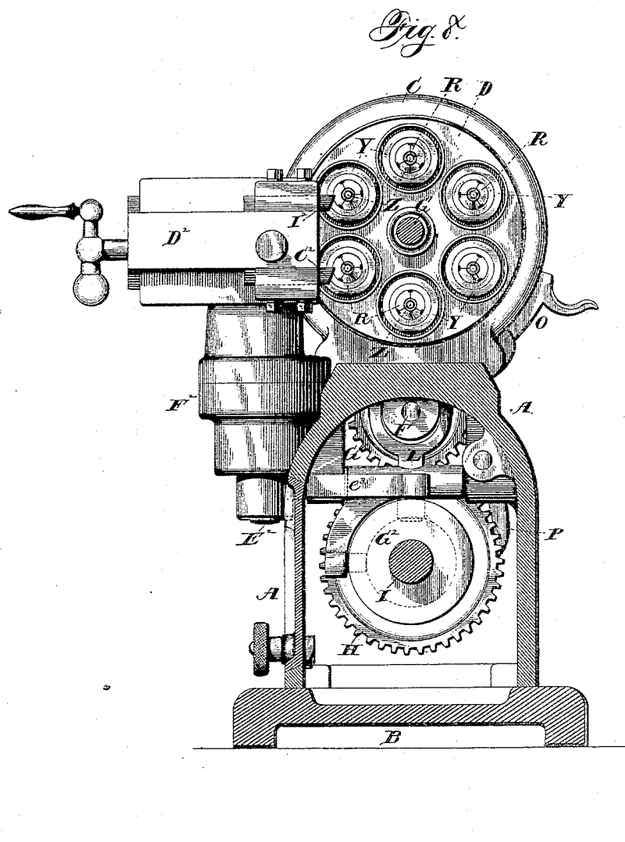
Fig. 8 is a cross-section upon line $x\ x$ of Fig. 2, and shows the means used for operating the shaping and cutting-off tools.
Figure 9:
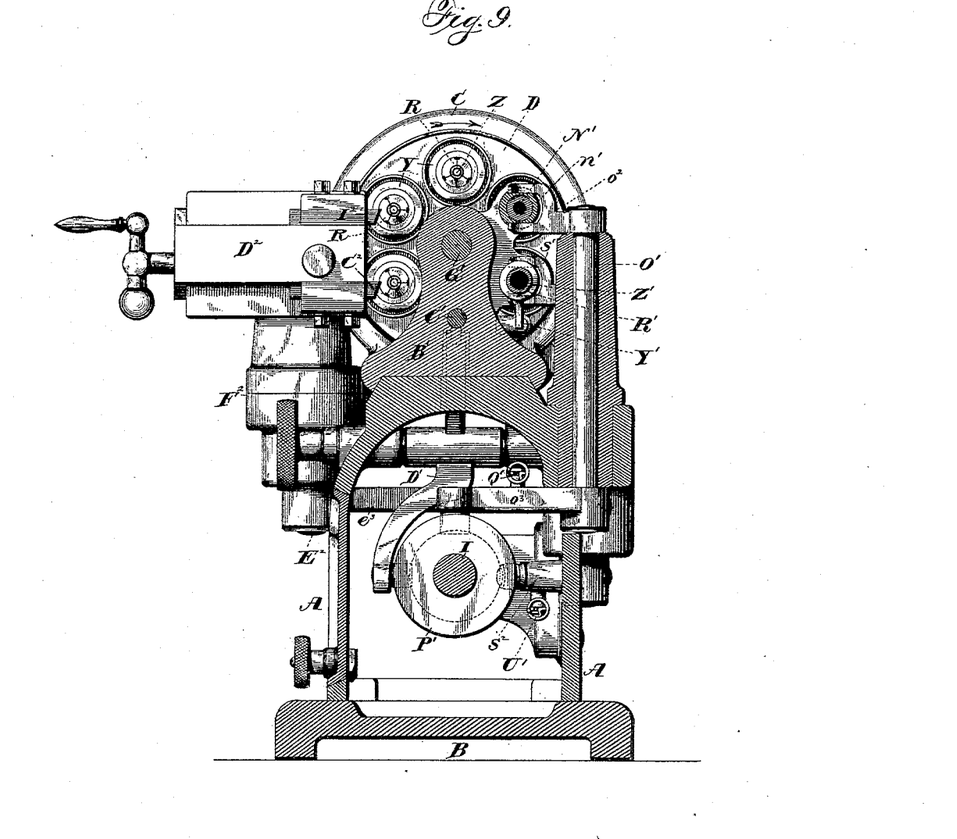
Fig. 9 is a like view upon line $z\ z$ of said figure, and shows the means employed for operating the pivoting and threading tools.
Figure 10:
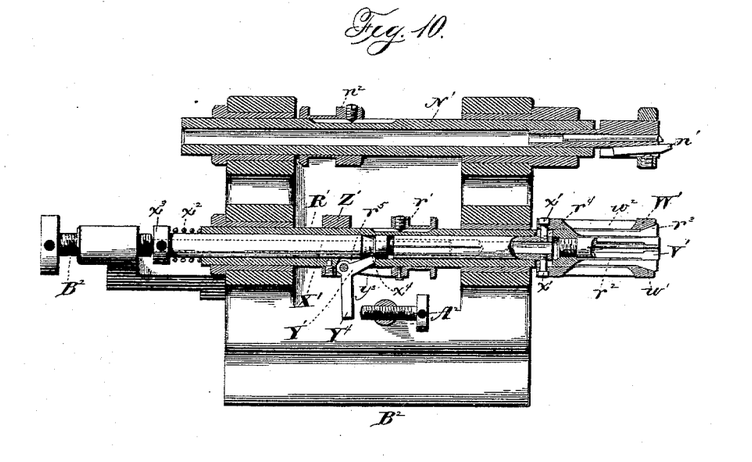
Fig. 10 is an enlarged section upon line $z'\ z'$ of Fig. 2, and shows the construction of the threading and pivoting spindles.
Figure 11:
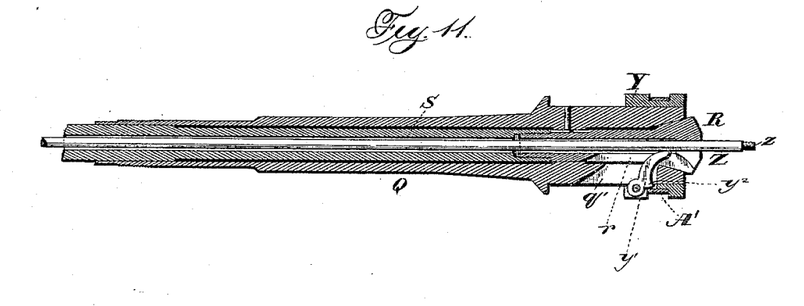
Fig. 11 is a like view through the axis of one of the holding and feeding spindles.

In the carrying of my invention into practice I employ a hollow frame, A, which has the general form shown and rests upon and is supported by a base, B, that preferably projects horizontally from beneath the same. Secured to the upper side of the frame at one side of its longitudinal center is a cylindrical housing, C, which is open at its ends, and from each end inward about one-fourth its length is made conical, as shown in Fig. 7.

Within the housing C is journaled a head, D, which corresponds thereto in peripheral size and shape, and is made in two separable sections, in order that it may be readily inserted. Upon the periphery of the rear projecting end of said journaled head are formed gear-teeth $d$, which are engaged by a pinion, E, that is secured upon one end of a shaft, F, which shaft is journaled within the frame A directly beneath said housing.

Upon the central portion of the shaft F is journaled a pinion, G, which meshes with wheel H, that is secured upon and rotates with a horizontally-journaled driving-shaft, I, that extends longitudinally through the frame A, the arrangement being such that said pinion is in constant motion whenever said driving-shaft is running. Upon said shaft F is placed a clutch, K, that is confined thereon circumferentially, while free to move lengthwise of said shaft within certain limits. One end of said clutch is adapted to engage with the contiguous end of said pinion G, and when moved into such engagement operates to lock said pinion and shaft together and to cause the journaled head D to revolve.

The head D is required to have an intermittent rotary movement, and such is secured by means of a lever, L, which is pivoted centrally upon or within the frame A, with its upper end in engagement with the clutch K and its opposite lower end in engagement with a peripheral groove, $m$, that is formed within a cam, M, upon the shaft I. Said cam-groove is so formed longitudinally as to cause said head D to be alternately revolved one-sixth of a revolution and then to have a period of rest.

In order that the head D may be locked in place when at rest and may be prevented from being carried by its momentum beyond the desired point, an annular plate, N, is secured upon its rear end and provided with six peripheral notches, $n$, that are each adapted to be engaged by a locking-pawl, O, when brought into the right position. Said pawl is pivoted upon the housing C, and is held with a yielding pressure in engagement with the index-plate by means of a spring, $o$, which is secured at one end to said housing and has its opposite end in engagement with a tail-piece, $o'$, of said pawl.

The pawl O is automatically raised from engagement with the index-plate N just before each partial rotation of the journaled head D by means of a lever, P, which is pivoted near its center upon or within the frame A, with its upper end in engagement with the tailpiece $o'$ and its lower end in position to be engaged by a cam-lug, $h$, upon the face of the gear-wheel H. Said lug acts upon said lever for so short a time that said pawl is released and impinges upon the periphery of said index-plate before the rotation of the latter brings a notch $n$ into position for engagement, by which means engagement, when permitted, is instantaneous and no liability exists that the momentum of the head D will carry it beyond the desired point.

At equidistant points around and parallel with the axis of the journaled head D are six spindles, Q, each of which is journaled within conical bearings of usual form, to insure its lateral and longitudinal position and to enable wear to be compensated. Each spindle contains within its front end a split chuck, R, of usual construction, that has attached to its rear end a draw-spindle, S, which extends rearward through said spindle and furnishes a means whereby said chuck may be moved longitudinally, so as to compress its split end or to permit the same to open.

The draw-spindle S is held with a yielding pressure at the rear limit of its motion by means of a spring, T, which is placed between the rear end of the spindle Q and a collar, $s$, that is secured upon said draw-spindle. It is moved longitudinally forward, so as to release the jaws of the chuck R, by the following-described mechanism:

Inclosing the spring T and collar $s$ is a cylindrical housing, U, which is adapted when moved forward to engage with the rear side of said collar and to move the same and the draw-spindle S in the same direction, such movement operating to compress said spring. Upon the rear projecting end of said housing is journaled a collar, $u$, to opposite sides of which is pivoted a ring-shaped lever, V, that is arranged radially, and has its inner end, $v$, in engagement with a recess, $d'$, which is formed within the periphery of a rearward extension of the head D, such groove acting as a fulcrum for each of said levers.

The normal position of each of the levers V is, as shown in Fig. 7, with its outer end, $v'$, in rear of the line of its inner end, and such position is maintained until each lever reaches the lower center, when said end $v'$ passes into engagement with the bifurcated upper end, $w$, of a lever, W. Said lever W is pivoted centrally within the frame A and has its lower end in engagement with the face of a cam, X, which is secured to and rotates with the driving-shaft I. Said cam is so constructed that as each spindle Q reaches the lower center of the housing C its lever V, which has passed into engagement with said lever W, has its lower end moved forward, carrying the draw-spindle S and chuck R in the same direction, after which the spring T is permitted to return said parts to their normal positions, and upon the next partial rotation of the head D said lever V passes out of engagement with said lever W. Surrounding the front projecting end of the spindle Q is a thimble, Y, which is adapted to slide lengthwise of the same within certain limits, and is held with a yielding pressure at the front limit of its motion by means of a volute spring, $y$, that is placed between the rear end of said thimble and a shoulder, $q$, which is formed upon said spindle.

Within the spindle Q, beneath the thimble Y, are provided three radial slots, $q'$, which are elongated lengthwise of said spindle and coincide with a like number of similar slots, $r$, that are formed within the chuck R by the enlargement of the ordinary splits within the front portion of the latter. Each of said slots contains a finger, $y'$, which has its outer end pivoted to or within the rear portion of said thimble, and from thence extends in a curve forward and inward, as shown in Fig. 7, where it will bear upon a rod or blank, Z, when the same is placed in said chuck.

The fingers $y'$ have their inner ends held in engagement with the blank Z by means of a spring, A', which encircles the thimble Y and bears upon a lug, $y^2$, that projects forward from or near the pivoted outer end of each of said fingers, and when said thimble is moved rearward upon the spindle Q said finger will drag easily over said blank; but when said thimble is released and permitted to be moved forward to its normal position by the action of the spring $y$ said fingers will engage with said blank rod and carry it in the same direction, such operation constituting the feeding forward of the latter.

The blank-feeding mechanism is manipulated as described by the following-described means, viz: Secured upon the frame A at the end opposite to the housing C is a tail-block, B', within which, in an exact line axially with the lower spindle Q, is fitted a mandrel, C', that is adapted to have therein a certain longitudinal motion, but is prevented from circumferential movement by means of a feather, $c'$, that engages with a corresponding spline in such tail-block. Said mandrel is moved forward by means of a lever, D', which is pivoted centrally within said frame A, with its upper end in engagement with the former and its lower end in engagement with a cam, E', that is secured upon the driving-shaft I, and has such form as to cause said mandrel to be moved quickly forward at the required movement and then permit it to be returned to its normal rear position by means of a spring, F', that is secured to said frame or tail-block and bears against the upper front portion of said lever D'. Within the front end of the mandrel C' is fitted an axially-arranged gage-screw, $c^2$, which is adapted to be adjusted longitudinally toward or from the spindle Q, and upon said mandrel at such point is secured a U-shaped head, $c^3$, that is arranged with the ends of its arms $c^4$ projecting forward from the upper and lower centers. Said arms have such relative arrangement as that when said mandrel is moved forward one of the same will pass above and one below the end of said spindle and will engage with the front end of the thimble Y and move the latter in the same direction.

The movements of the parts of the chucking or feeding mechanism are relatively timed so that the feeding-thimble is first moved rearward. The chuck is then opened, so as to release the blank rod. Said feeding-thimble is then permitted to move forward to its normal position, carrying with it said rod, and, lastly, said chuck is closed and said rod again clamped firmly therein.

Each of the spindles Q requires to be revolved constantly when the machine is in use, for which purpose a shaft, G', is journaled within the tail-block B', and at the axial center of the journaled head D, and within the latter, carries a pinion, H', that meshes with a pinion, I', which is secured to each of said spindles. Said shaft, which is the main shaft, is driven by means of a belt that passes around a pulley, K', upon its rear end, and its motion is communicated to the lower shaft, I, by a worm, $g'$, which is secured to and rotates with its rear portion a bevel-wheel, L', that is attached to the rear end of said shaft I, and an intermediate shaft, M', that extends vertically between said shafts I and G', and is provided upon its upper end with a worm-wheel, $m'$, which engages with said worm, and upon its lower end with a pinion, $m^2$, that meshes with said bevel-gear.

The first operation consists in cutting away the projecting end of the rod-blank Z, so as to form the body of the screw end $z$. This is accomplished when said rod is within the chuck first in rear of the upper center of the head by means of a cutter, $n'$, of usual form, which is secured upon or within the front end of a spindle, N', that is placed within the tail-block B' in a line axially with said chuck, and is adapted to have a certain amount of longitudinal motion therein, while prevented from moving circumferentially.

The cutter-spindle N' is moved longitudinally forward at the required time by means of a rock-shaft, O', which is journaled vertically at the rear side of the tail-block B' and has its upper radial arm, $o'$, in engagement with a grooved collar, $n^3$, upon the central portion of said spindle and its lower radial arm, $o^2$, in engagement with a cam, P', that is secured to and revolves with the shaft I. A spring, Q', secured at one end upon the frame A and at its opposite end to said arm $o^2$, operates to hold the latter with a yielding pressure against said cam and to return said spindle to its rear normal position when permitted so to do.

The next operation consists in threading the screw end $z$ of the pillar Z, which is accomplished when the blank, after having been operated upon by the cutter $n'$, is moved downward to the next position. To accomplish such operation, there is placed within suitable bearings in the tail-block B', in exact line axially with the spindle Q which is second in order from the upper center of the head D, a spindle, R', which is incapable of circumferential motion, but is moved longitudinally the required distance by means of a rock-shaft, S', that is the counterpart of the rock-shaft O', and has its upper radial arm, $s'$, in engagement with a grooved collar, $r'$, upon the central portion of said spindle, and its lower radial arm, $s^2$, in engagement with a cam, T', upon the shaft I. A spring, U', connected with and extending between said arm $s^2$ and a contiguous portion of the frame A, operates to hold said spindle with a yielding pressure at the rear limit of its motion.

The front end of the spindle R' has the external form of an ordinary split chuck, and, like the same, is split longitudinally, so as to enable each of its jaws to spring open a distance that more than equals the depth of the thread to be cut. Within said spindle is provided a plain axial opening, $r^2$, that contains within its front end a threading-die, V', which has its front portion slitted longitudinally and at its rear end is secured within said opening $r^2$ by any desired means, the arrangement being such that said spindle and die are combined circumferentially and longitudinally and that the expansion and compression of the jaws of the latter are governed by the like movements of the jaws of said spindle.

The split end of the spindle R' is inclosed by means of a thimble, W', which is adapted to slide lengthwise of the same, and within its front end has an outward flare, $w'$, that corresponds to the outward and forward inclination of the periphery of said spindle at such point $r^3$, such construction enabling the said split end of said spindle to be closed together by a forward movement of said thimble and to be permitted to expand whenever the latter is moved rearward.

The movements of the thimble W' are produced by means of a mandrel, X', which is placed within the spindle R' and extends from a point slightly in advance of the rear end of said thimble to and beyond the rear end of said spindle. The front end of said mandrel is connected with the rear end of said thimble by means of two screws, $x'$, that extend radially from opposite sides between said parts and pass through slots $r^4$, which are provided in said spindle. Said slots are elongated in a line with the axis of the latter, so as to enable said thimble to be moved by said mandrel the distance necessary for the opening and closing of the threading-die V'.

The mandrel X' is held with a yielding pressure at the rear limit of its relative motion, so as to cause the threading-die V' to be normally open by means of a spring, $x^2$, which is placed between the rear end of the spindle R' and a collar, $x^3$, that is secured upon the rear end of said mandrel. It is held at the front limit of its relative motion when said threading-die is closed by means of a trigger, Y', which is pivoted within the lower side of a collar, Z', that is secured upon and made adjustable lengthwise of said spindle. Said trigger passes through a slot, $r^5$, within the latter forward and inward, and has its free end in position to engage with a circumferential groove, $x^4$, which is formed within the periphery of said mandrel. The trigger Y' is held with a yielding pressure against the mandrel X' in engagement with the groove $x^4$ by a spring, $y^3$, and is released from such engagement by means of an arm, $y^4$, that extends downward from the point where it is pivoted, and as the spindle R' reaches the limit of its motion in a forward direction is engaged by an adjustable stop, $A^2$, which is secured upon the tail-block B'.

The mandrel X' is moved to its relatively front position, so as to close the threading-die V', by means of an adjustable stop, $B^2$, which is secured to the tail-block B' and engages with the rear end of said mandrel when the spindle R' nears the limit of its rearward movement. In use said spindle moves forward with said threading-die closed, and into the latter is run the reduced end $z$ of the revolving pillar-blank Z, such operation forming a thread upon said end. When the die reaches nearly to the shoulder at the end of the said threaded part, the trigger Y' is released by contact with the stop $A^2$, said threading-die opens, and at the same instant said spindle is moved to the rear limit of its motion. This leaves said pillar-blank free, and at the same time closes said threading-die to position for a repetition of the operation described. In order that the threading-die V' may not become choked with chips, the radial longitudinal slits of the same and of the spindle R' are widened in rear of their front ends, and coinciding radial openings $w^2$ are formed within the thimble W'. After having had its end $z$ threaded, the pillar-blank Z moves downward and forward to the lower center of the journaled head, when the chucking mechanism, before described, operates and feeds the rod forward the necessary distance to enable the pillars to be completed and to leave room upon said rod after said pillar has been removed to form the screw end of the next pillar. From the chucking mechanism the pillar-blank Z now moves forward and upward one-sixth of a revolution of the head D, after which its body is shaped by means of a tool, $C^2$, that is held within a slide-rest, $D^2$, and is caused to advance to the required point, and after having accomplished its purpose is retracted again.

The inward movement of the slide $D^2$ is effected by means of a rock-shaft, $E^2$, which is journaled vertically within a standard, $F^2$, upon the front of the frame A, (that also serves as a support for said slide,) with its upper radial arm, $e^2$, in engagement with said slide and its lower radial arm, $e^3$, in engagement with a cam, $G^2$, upon the shaft I. The outward movement of said slide is secured by means of a spring, $H^2$, that is placed within a suitable housing within said slide or its way $D^3$, with one end in engagement with one of said parts and its opposite end in engagement with the other part, so as to cause its longitudinal expansion or contraction to move said slide outward over said way. Such action of said spring serves to hold said rock-shaft arm $e^3$ with a yielding pressure in contact with said cam.

Having had its body shaped by the tool $C^2$, the pillar-blank is next moved upward to the fifth position of the series, where it is acted upon by a tool, $I^2$, that is held within the slide $D^2$, and upon the inward movement of the latter is brought into engagement with said blank, and completes the same by forming the top-plate pivot $z'$ and partially cutting the same from the rod-blank.

The next partial rotation of the journaled head carries the completed pillar to the upper center, where there is presented to it one of the threaded openings of a pillar-plate, which plate is held in the hand of an operative, and by the rotation of said pillar is drawn upon the latter until it reaches the shoulder at the end of the threaded end $z$, when its further rotation is arrested and the uncut stock between its pivot $z'$ and the rod-blank is twisted off, leaving said pillar screwed firmly in place within said plate.

The action of the mechanism upon but one pinion has been described; but it will be understood that while each of the separate operations was being simultaneously performed upon the same each of the five other operations was being simultaneously performed upon an equal number of other partly or wholly completed pillars.

Having thus described my invention, what I claim is—

1. As an improvement in the manufacture of pillars for watch-plates, an automatic organization in which are combined a journaled head that is adapted to be rotated step by step, a series of chuck-spindles which are journaled within said head and are each adapted to hold a stock-rod, a series of tools that by successive action are adapted to form and thread the screw-pivot to shape the body, to form the top-plate pivot, and to cut off the completed pillar, and means whereby said chucks are rotated within their head, said head is rotated step by step, said tools are moved into and out of contact with the work, and each stock-rod is fed forward and each of such operations is simultaneously performed, substantially as and for the purpose specified.

2. As an improvement in the manufacture of pillars for watch-plates, an automatic organization in which are combined a series of tools that by successive action are adapted to perform each of the operations between the roughing out and completion of a pillar, a series of stock-holding chucks which exceed said tools in number and are journaled within a journaled head that is adapted to have a step-by-step rotation around its axis, a stock-feeding mechanism which is arranged to act midway between the first and last of said tools, and means whereby said tools are moved into and out of contact with the work and each of said operations is simultaneously performed, substantially as and for the purpose shown.

3. As an improvement in the manufacture of pillars for watch-plates, an automatic organization in which are combined journaled chucks for holding a number of stock-rods and for simultaneously rotating the same around their axes, a cutter for forming the screw-pivot of a pillar, a die for threading such pivot, chucking mechanism for feeding forward the blank rod, a cutter for shaping the body of the pillar, a cutter for forming the top-plate pivot and cutting the same nearly from the rod, and means whereby said screw-pivot may be screwed into a pillar-plate and the completed pillar separated from the blank rod, said operations being performed in the order named upon each of said blanks, and all of said operations being simultaneously carried on, substantially as and for the purpose set forth.

In testimony that I claim the foregoing I have hereunto set my hand this 14th day of May, 1886.

FRANK LEMAN.

Witnesses:
GEO. S. PRINDLE,
CARLOS H. SMITH.